M. J. FARMER
Tobacco Packing-Presses.

No. 153,061.  Patented July 14, 1874.

WITNESSES:
G. Matthys
John C. Kenon

INVENTOR:
M. J. Farmer
BY
Munn & Co.
ATTORNEYS.

UNITED STATES PATENT OFFICE.

MARCELLUS J. FARMER, OF LYNCHBURG, VIRGINIA, ASSIGNOR OF ONE-HALF HIS RIGHT TO WILLIAM R. MUSSER, OF SAME PLACE.

IMPROVEMENT IN TOBACCO-PACKING PRESSES.

Specification forming part of Letters Patent No. 153,061, dated July 14, 1874; application filed June 4, 1874.

*To all whom it may concern:*

Be it known that I, MARCELLUS J. FARMER, of Lynchburg, in the county of Campbell and State of Virginia, have invented a new and Improved Tobacco-Packing Press; and I do hereby declare that the following is a full, clear, and exact description of the same, reference being had to the accompanying drawing, forming a part of this specification, in which—

Figure 1:
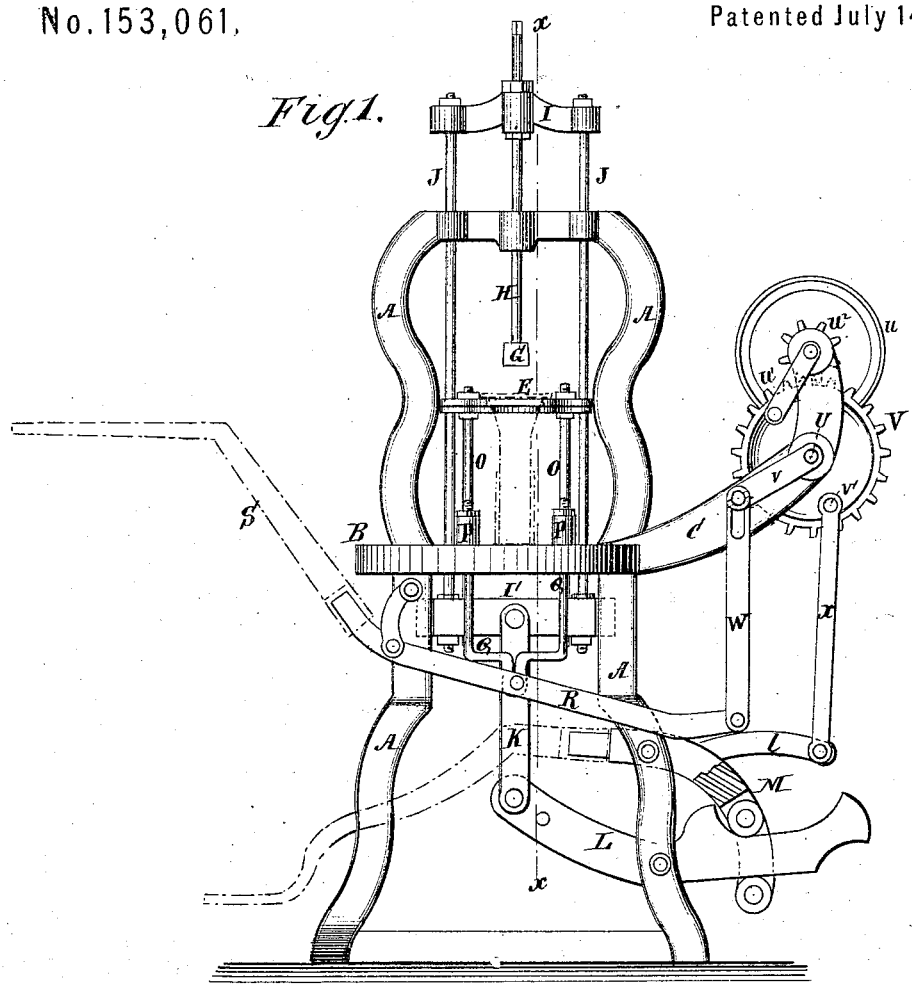
Figure 3:
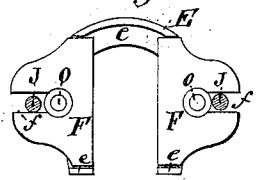
Figure 2:
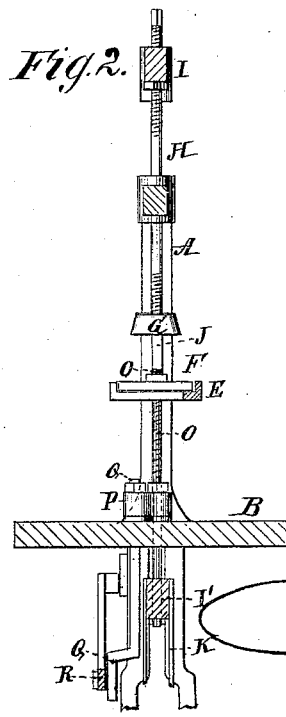

Figure 1 is a side elevation. Fig. 2 is a transverse section in line $x\ x$ of Fig. 1. Fig. 3 is a detail view.

The invention will first be fully described, and then pointed out in the claims.

A represents the frame; B, the table or platform, and C a projecting arm or bracket. D is a bottomless mold, in which the bag is placed, and which is provided with lateral flanges, $d\ d$, that rest upon and are supported by the rising holder or yoke E. The latter has flanges $e$, between which may be adjusted the plates F, having slots $f$, whereby molds of different size and capacity may be held by the same yoke. G is the compress attached to one end of a screw-rod, H, that is adjustable in the nut of a cross-bar, I. The latter is provided with two rods, J J, connected at the lower ends by a second cross-bar, I'. This is attached by straps K K to the lever L, whose power end passes between two friction-rolls, and through a slot in the end of a lever, M, both these levers passing through and being fulcrumed in a slot of the frame A. By vibrating the lever M through a treadle, N, or other power mechanism, the lever L is caused to oscillate, carrying the compress up or down.

The yoke is affixed to adjustable screw-rods O O, connected, by the double nut P and bifurcated bar Q, with a lever, R, that may be operated by a handle, S, or by power mechanism. U is a shaft, which may be rotated through a pulley, $u$, from any power, or turned by a hand-crank, $u^1$, and that communicates through a pinion, $u^2$, with a spur-wheel, V. The latter is connected, by an arm, $v$, and the end-slotted rod W, with yoke-lever R, and by wrist-pin $v'$ and pitman X with the arm $l$ of compress-lever L. By this means the same shaft U serves to operate without intermission twice on the compress G and intermediately once on the yoke or mold-holder E, the former being first made to do its press-work, the latter being then drawn up over it, while the tobacco is held down in the bag, and the compress finally withdrawn to permit the removal of bag with its contents. Another bag may be inserted in the same mold, or a different mold may be substituted.

Having thus described my invention, what I claim as new is—

1. The combination, with yoke E, having flanges $e$, of slotted adjustable plates F, as and for the purpose set forth.

2. The combination, with wheel V, having wrist-pin and crank-arm, of end-slotted rod W and pitman X, the levers R L M, and the rods for moving the compress and yoke, substantially as and for the purpose specified.

MARCELLUS J. FARMER.

Witnesses:
EDWARD G. JENKINS,
THOS. POOLE.